(12) United States Patent
Cao et al.

(10) Patent No.: US 9,331,814 B2
(45) Date of Patent: May 3, 2016

(54) HYBRID AUTOMATIC REPEAT-REQUEST COMBINATION FOR WIRELESS TRANSMISSIONS

(75) Inventors: Jinyu Cao, Beijing (CN); Senjie Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 13/991,910

(22) PCT Filed: Jun. 14, 2012

(86) PCT No.: PCT/CN2012/076906
§ 371 (c)(1),
(2), (4) Date: Jun. 6, 2013

(87) PCT Pub. No.: WO2013/185325
PCT Pub. Date: Dec. 19, 2013

(65) Prior Publication Data
US 2014/0059400 A1    Feb. 27, 2014

(51) Int. Cl.
*H04L 1/08* (2006.01)
*H03M 13/00* (2006.01)
*H04L 1/00* (2006.01)
*H04L 1/18* (2006.01)

(52) U.S. Cl.
CPC ............... *H04L 1/08* (2013.01); *H04L 1/0045* (2013.01); *H04L 1/1812* (2013.01); *H04L 1/1845* (2013.01)

(58) Field of Classification Search
CPC ... H04L 1/0045; H04L 1/1845; H04L 1/1812; H04L 1/08; H04L 1/1819; H04L 1/0066; H04L 1/0003
USPC ............ 714/748–752, 755, 795, 788; 370/328–329, 335, 342; 375/240, 262, 375/341
See application file for complete search history.

(56) References Cited

U.S. PATENT DOCUMENTS

2010/0272033 A1* 10/2010 Fwu et al. ............... 370/329
2012/0054572 A1*  3/2012 Andersen et al. ........ 714/748

FOREIGN PATENT DOCUMENTS

| CN | 101548320 | 9/2009 |
| CN | 102315919 | 1/2012 |

OTHER PUBLICATIONS

PCT International Search Report and Written Opinion issued in corresponding PCT/CN20121076906 dated Mar. 21, 2013 (11 pages).

* cited by examiner

*Primary Examiner* — Guy Lamarre
(74) *Attorney, Agent, or Firm* — Trop Pruner & Hu, P.C.

(57) ABSTRACT

In one embodiment, a method for data communication may include receiving a first set of soft bit values in a Hybrid Automatic Repeat-Request (HARQ) buffer using a first bit width. The method may also include soft combining the first set of soft bit values with a second set of soft bit values to obtain a set of combined soft bit values. The method may also include transforming the set of combined soft bit values from the first bit width to a decoder input bit width to obtain a set of transformed soft bit values.

30 Claims, 6 Drawing Sheets

HYBRID AUTOMATIC REPEAT-REQUEST COMBINATION FOR WIRELESS TRANSMISSIONS

BACKGROUND

Embodiments relate generally to wireless communication networks.

As mobile and wireless networks grow in popularity, radio and wireless communication standards may be adapted to increasing bandwidth requirements. Such communication standards may enable various electronic devices to use wireless signals to communicate with a data network. For example, an electronic device may establish a wireless connection to a local base station in order to access a broader data network such as the Internet. In addition, multiple electronic devices may use such communication standards to communicate with each other.

DETAILED DESCRIPTION

Some wireless communication systems may techniques to compensate for transmission errors. In Forward Error Correction (FEC), the sender encodes the data using an error-correcting code (ECC) before transmitting the data. The ECC may be used by the receiver to determine the original data. Further, in Automatic Repeat Request (ARQ), an error detection scheme is combined with requests for retransmission of erroneous data.

In Hybrid Automatic Repeat-Request (HARQ), the techniques of ARQ and FEC may be combined: relatively minor errors may be corrected by the receiver, and relatively major errors may be addressed by retransmission from the sender. Further, in some implementations, HARQ may be used with combining, meaning that an incorrectly received data block may be stored at the receiver rather than discarded, and when the retransmitted data block is received, the two data blocks may be combined to provide more a more accurate result. The HARQ combining may be hard combining, meaning that each received bit is stored as a specific value such as 0 or 1. Alternatively, the HARQ combining may be soft combining, meaning that each received bit is stored as any of a range of values (referred to as a "soft bit"). In soft combining, a relatively large positive value may reflect the probability that the actual value of the bit is 1. Further, a relatively large negative value may reflect the probability that the actual value of the bit is 0.

Conventionally, HARQ with soft combining may be performed using saturated addition, such that values of repeated bits are added, and the result is not allowed to exceed a maximum value (or to be less than a minimum value in the case of negative bit values). This approach enables the use of a buffer having a small bit width, and allows for simpler and faster calculations. However, this approach may result in loss of information due to the saturated addition, particularly in the case of multiple repeated transmissions.

In accordance with some embodiments, HARQ with soft combining may be performed using a buffer having sufficient width to store combined soft bit values without using saturated addition. In one or more embodiments, the combined soft bit values may be dynamically transformed to match the bit width of a decoder input. Further, in one or more embodiments, the transforming of the combined soft bit values may be based on the maximum absolute soft bit value stored in the buffer. This approach may enable use of soft combining with reduced loss of information due to buffer limitations. Accordingly, some embodiments may provide more accurate results than using conventional techniques.

Figure 1:
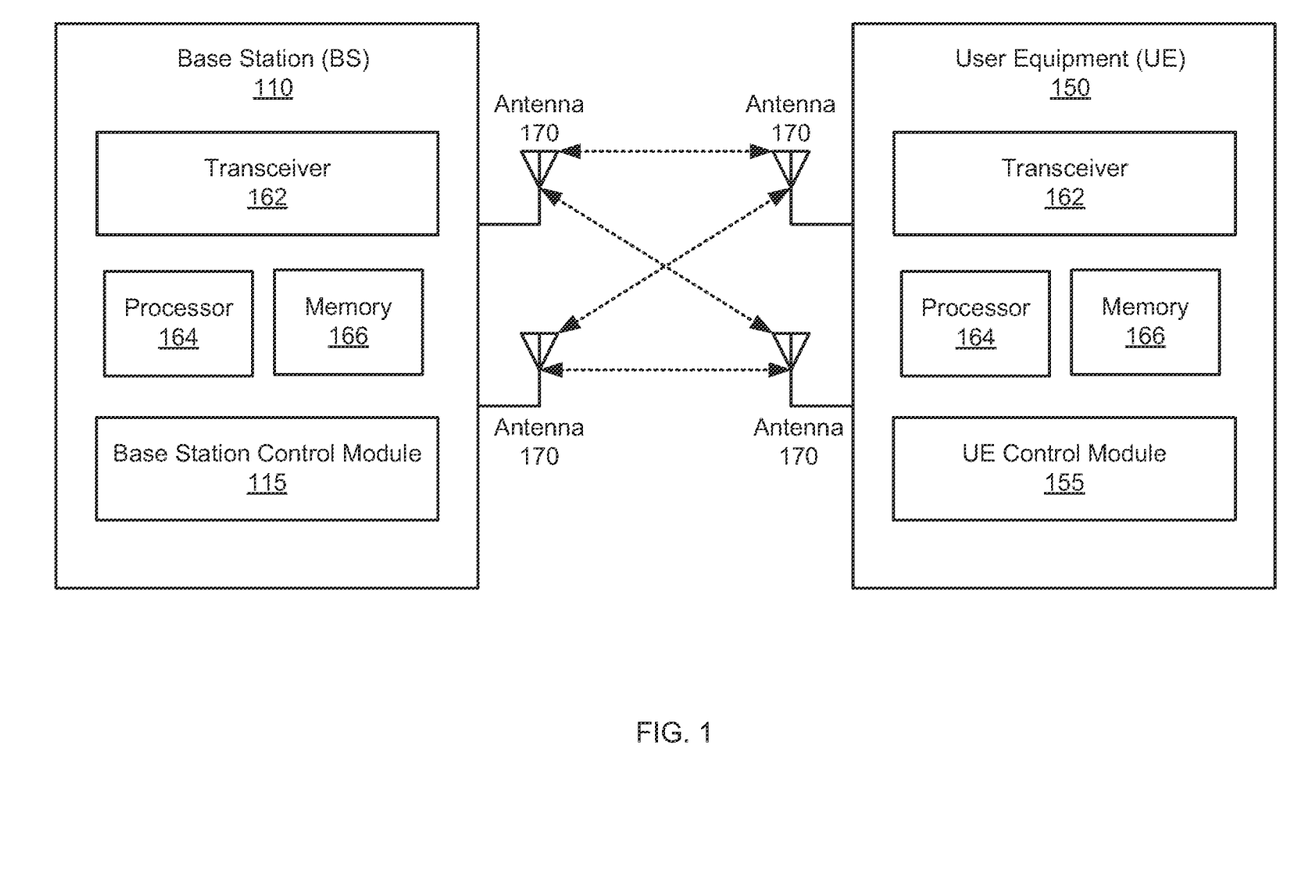
FIG. 1 is a block diagram of a system in accordance with one or more embodiments.

Referring to FIG. 1, an example system 100 may include a base station 110 and a User Equipment (UE) device 150. In accordance with some embodiments, the UE device 150 may be any electronic device configured to communicate via wireless communications technologies, such as a cellular telephone, a laptop computer or a handheld computer (e.g., a personal digital assistant) with a transceiver (i.e., a radio interface), etc. Further, the UE device 150 may also be any vehicle (e.g., car, truck, boat, etc.) equipped with a radio interface. The base station 110 may provide a wireless interface to a larger network (not shown) such as a core network, a local area network, the Internet, etc. For example, the base station 110 may be an Evolved Node B (eNB), a wireless access point, a cellular tower, etc.

In accordance with some embodiments, the base station 110 and the UE device 150 may each include a transceiver 162, a processor 164, a memory device 166, and one or more antennas 170. In one or more embodiments, the base station 110 may also include a base station control module 115. Further, in one or more embodiments, the UE device 150 may also include a UE control module 155.

In one or more embodiments, the base station control module 115 may include functionality to enable the base station 110 to transmit and receive wireless signals to/from the UE device 150. In accordance with some embodiments, the UE control module 155 may include functionality to enable the UE device 150 to transmit and receive wireless radio signals to/from the base station 110.

In one or more embodiments, the base station control module 115 and/or the UE control module 155 may include functionality to perform HARQ using soft combining with dynamic scaling. This HARQ functionality is described further below with reference to FIGS. 2-4.

In one or more embodiments, the wireless transmissions between the base station 110 and the UE device 150 may be Multiple-Input and Multiple-Output (MIMO) transmissions using two or more antennas 170 at each end. Such MIMO transmissions may increase spectral capacity by transmitting multiple data streams simultaneously in the same frequency and time, thereby allowing use of different paths in the radio channel.

The wireless transmissions between the base station 110 and the UE device 150 may be based on any radio communications technologies and/or standards. For example, such wireless signals may include Long Term Evolution (LTE) signals (3rd Generation Partnership Project (3GPP) standards, TS36 version 10.0, published October 2010), Universal Mobile Telecommunications System (UMTS) signals (3GPP standards, TS25 version 10.0, published March 2011), Wi-Fi signals (IEEE (Institute of Electrical and Electronics Engineers) 802.11 standard, IEEE 802.11-2007, published Jun. 12, 2007), Wi-MAX signals (IEEE 802.16 standard, IEEE 802.16-2004, published Oct. 1, 2004), etc.

In one or more embodiments, the UE control module 155 and/or the base station control module 115 may be implemented in hardware, software, and/or firmware. In firmware and software embodiments, they may be implemented by computer executed instructions stored in a non-transitory computer readable medium, such as an optical, semiconductor, or magnetic storage device.

Figure 2:
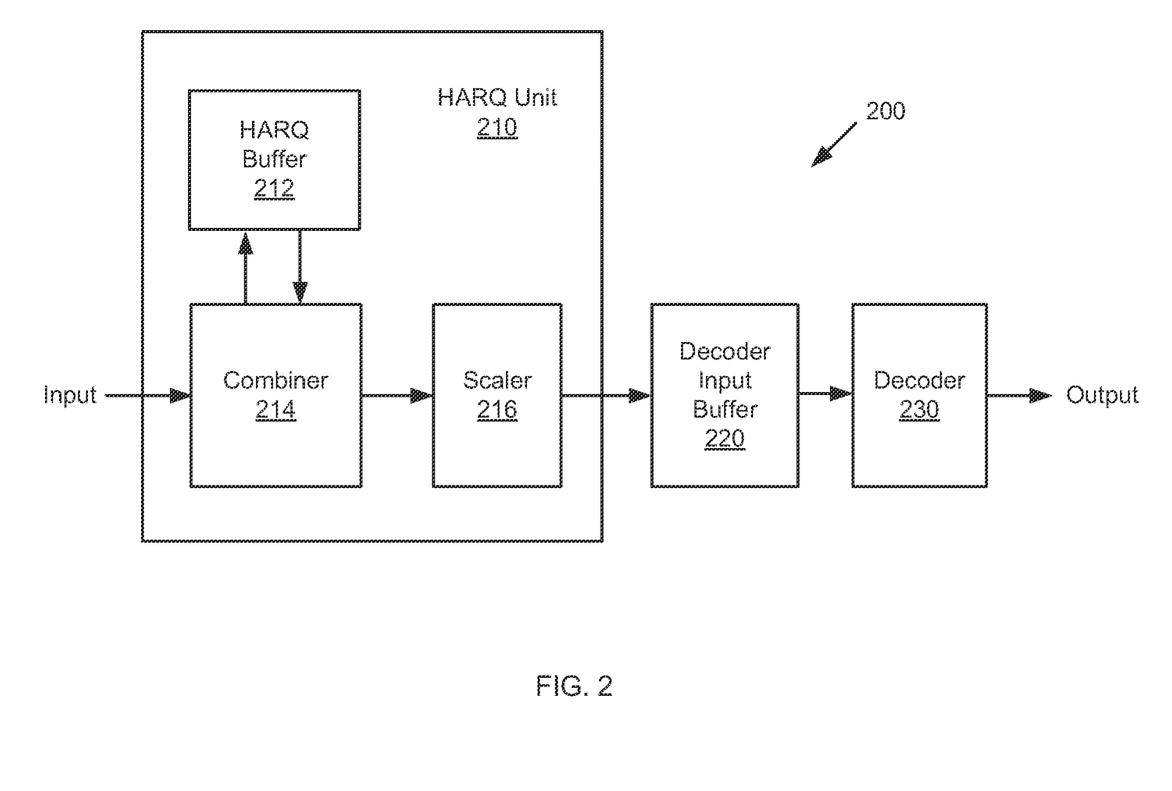
FIG. 2 is a block diagram of a system in accordance with one or more embodiments.

Referring to FIG. 2, shown is a block diagram of a receive logic 200 in accordance with one or more embodiments. More specifically, the receive logic 200 may generally correspond to all or a portion of the base station control module 115, the UE control module 155, and/or other elements shown in FIG. 1.

As shown, the receive logic 200 may include a HARQ unit 210, a decoder input buffer 220, and a decoder 230. In one or more embodiments, the HARQ unit 210 may include a HARQ buffer 212, a combiner 214, and a scaler 216. In some embodiments, received transmission data (labeled "Input") may be a set of soft bit values, and may be provided to the combiner 214. Such input may be an initial transmission of a data message (e.g., a data block, a frame, etc.). Further, in some embodiments, such input may also be subsequent retransmissions of the same data. In one or more embodiments, the retransmission of data may be performed in response to a request for retransmission. In some embodiments, the request for retransmission may be generated by the receiver logic 200 in response to determining that an earlier message included a particular amount or level of transmission errors.

In one or more embodiments, the combiner 214 may include functionality to store the soft bit values of an initial transmission in the HARQ buffer 212. In some embodiments, the HARQ buffer 212 may be a data buffer to store soft bit values for K bits. Further, in one or more embodiments, the HARQ buffer 212 may store each stored soft bit value using bit width W (i.e., as a binary number having W bits). In one or more embodiments, the bit width W may be predefined to store any soft bit values included in a received transmission. In some embodiments, the HARQ buffer 212 may be a physical memory device.

In accordance with some embodiments, the combiner 214 may also include functionality to soft combine values of repeated bits from retransmissions using simple addition (i.e., not using saturated addition). In one or more embodiments, such functionality may include adding the values of newly-received bits to the values of previously-received bits (i.e., the corresponding bits stored in the HARQ buffer 212) to obtain combined values. Accordingly, in some embodiments, the combined values may be calculated without information loss due to saturated addition. Further, in some embodiments, such functionality may include storing the combined values in the HARQ buffer 212.

As shown in FIG. 2, in some embodiments, the combined bit values stored in the HARQ buffer 212 may be provided to the scaler 216. In one or more embodiments, the scaler 216 may include functionality to transform the combined bit values from the HARQ buffer 212 based on the bid width required by the decoder 230. This functionality is described further below with reference to FIG. 4. Further, in some embodiments, the scaler 216 may provide the transformed bit values to the decoder input buffer 220.

In one or more embodiments, the decoder input buffer 220 may store values for N bits. Further, in some embodiments, the bit values stored in the decoder input buffer 220 may provided to the decoder 230. In some embodiments, the decoder 230 may include functionality to perform FEC decoding of the input values, and to provide an output of decoded bits.

Figure 3:
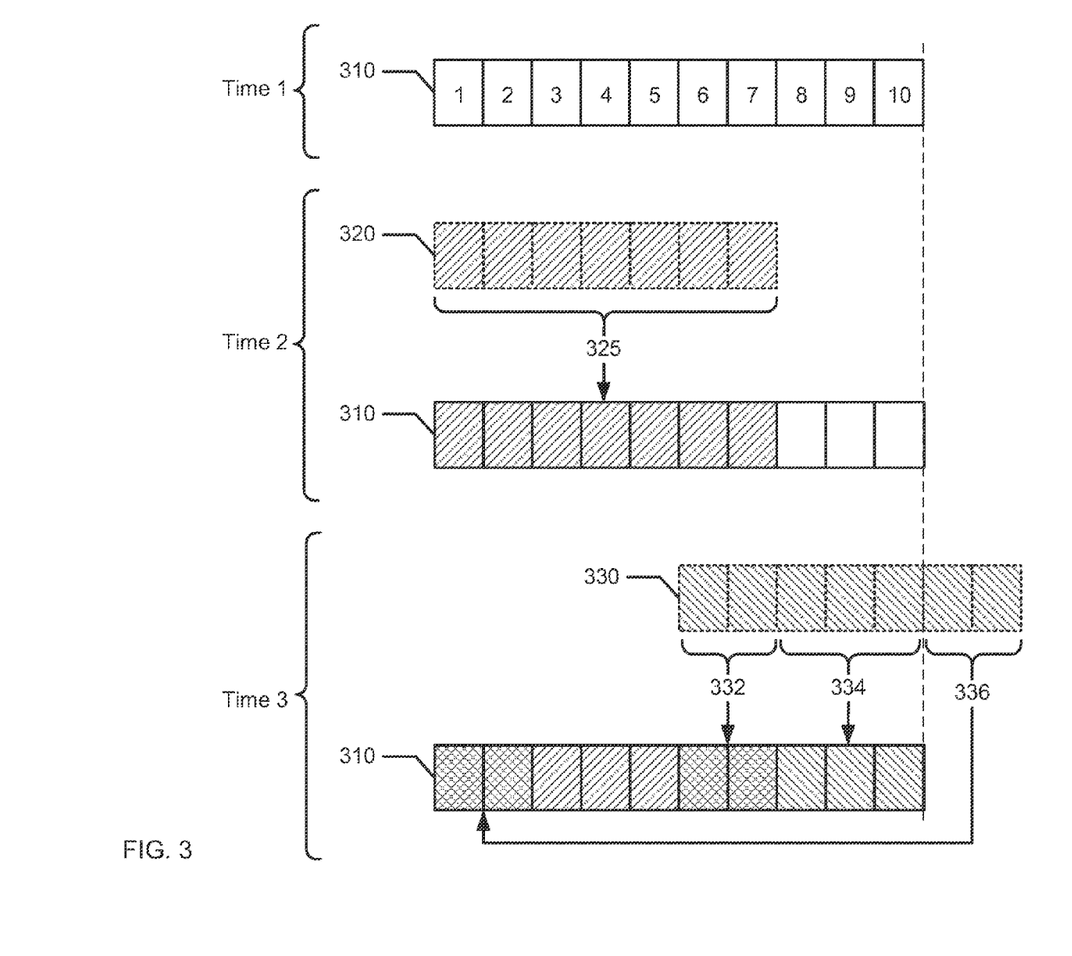
FIG. 3 is an example in accordance with one or more embodiments.

Referring to FIG. 3, an example of soft combining is shown in accordance to some embodiments. In particular, FIG. 3 shows a block diagram of HARQ buffer 310 at three points in time (labeled "Time 1", "Time 2", and "Time 3"). Note that the HARQ buffer 310 may be a simplified representation of the HARQ buffer 212 shown in FIG. 2. However, the HARQ buffer 310 is provided for purposes of illustration only, and is thus not intended to limit any embodiments.

At Time 1, the HARQ buffer 310 is empty, and includes locations for ten soft bit values (e.g., locations 1-10). Assume that the bit width W of the values in the HARQ buffer 310 is six bits signed. Accordingly, each soft bit value in the HARQ buffer 310 may range between −31 and +31. Assume further that the locations of the HARQ buffer 310 may correspond to the positions of bits within a unit of transmission (e.g., a block, a frame, etc.).

At Time 2, a first transmission 320 is received. As shown, in this example, the first transmission 320 includes seven bit values, corresponding to bit positions 1-7. Accordingly, a storage operation 325 stores the bit values of the first transmission 320 in the corresponding locations of the HARQ buffer 310 (i.e., locations 1-7).

At Time 3, a second transmission 330 is received. As shown, the second transmission 330 includes seven bit values, corresponding to bits 1, 2, and 6-10. Note that, in this example, the HARQ buffer 310 already includes previous values in locations 1, 2, 6, and 7 (from first transmission 320), but locations 8-10 are empty. Accordingly, a storage operation 334 simply stores the values of bits 8-10 in locations 8-10. Further, as shown, a first addition operation 332 may soft combine the values of bits 6 and 7 from the second transmission 330 with the stored values from locations 6 and 7.

Furthermore, a second addition operation 336 may soft combine the values of bits 1 and 2 from the second transmission 330 with the stored values from locations 1 and 2. In a similar manner, values from subsequent transmissions may be combined in the HARQ buffer 310 prior to being provided to a decoder input buffer (e.g., decoder input buffer 220 shown in FIG. 2).

Note that the examples shown in FIGS. 1-3 are provided for the sake of illustration, and are not intended to limit any embodiments. For example, embodiments may include any number and/or arrangement of UE devices 150 and/or base stations 110. In another example, it is contemplated that some embodiments may include any number of components in addition to those shown, and that different arrangement of the components shown may occur in certain implementations. In yet another example, it is contemplated that the functionality of the receive logic 200 described above may be implemented by any component of base station 110 and/or UE device 150. In yet another example, it is contemplated that the receive logic 200 may use any number of transmissions, number of bits, bit width, etc. Further, it is contemplated that specifics in the examples may be used anywhere in one or more embodiments.

Figure 4:
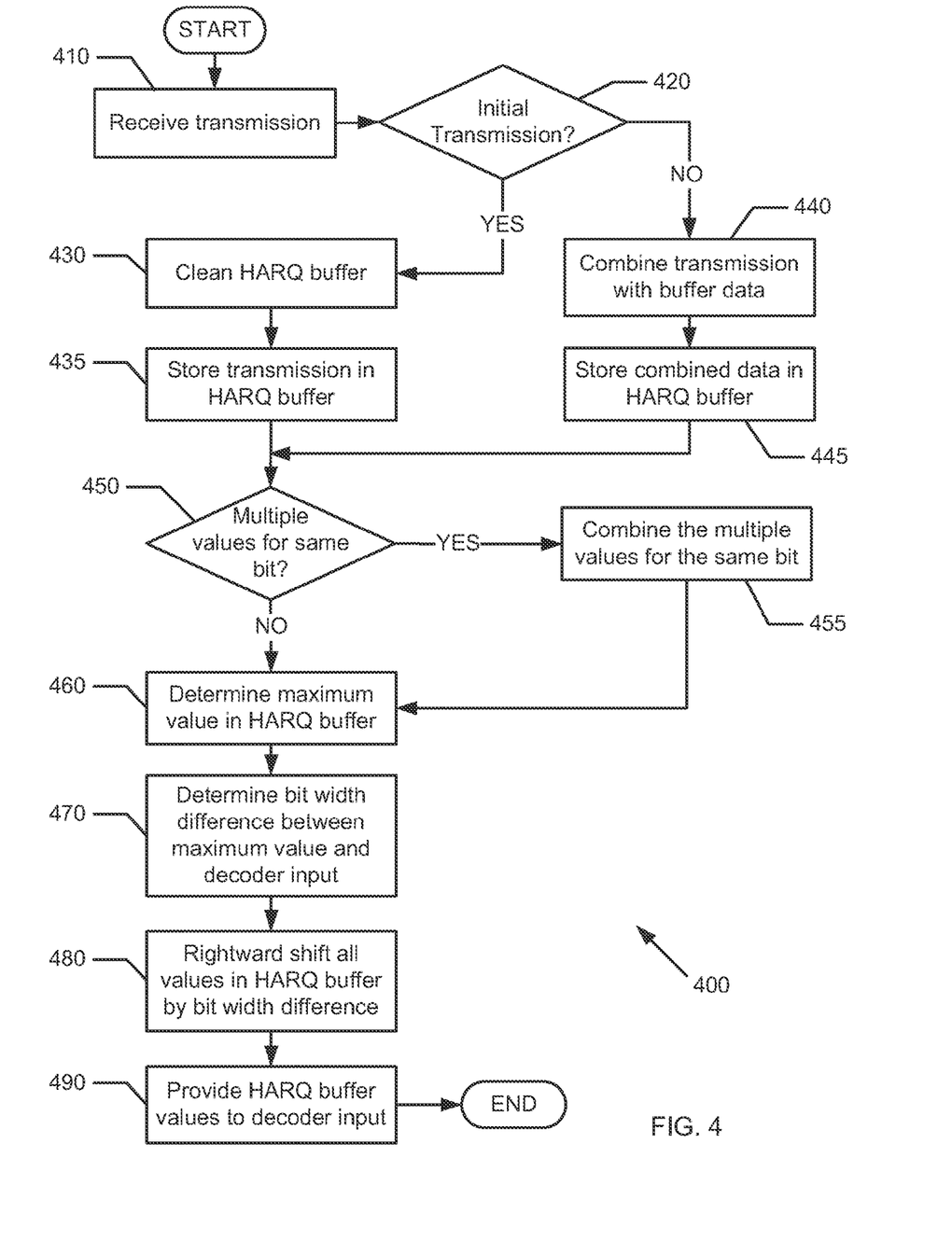
FIG. 4 is a flow chart of a method in accordance with one or more embodiments.

FIG. 4 shows a sequence 400 for HARQ combining in accordance with one or more embodiments. In one or more embodiments, the sequence 400 may be part of the base station control module 115 and/or the UE control module 155 shown in FIG. 1. In other embodiments, the sequence 400 may be implemented by any other component of base station 110 or UE device 150. The sequence 400 may be implemented in hardware, software, and/or firmware. In firmware and software embodiments it may be implemented by computer executed instructions stored in a non-transitory computer readable medium, such as an optical, semiconductor, or magnetic storage device.

At step 410, a data transmission may be received. In some embodiments, the received transmission may include a number of soft bit values. For example, referring to FIG. 2, assume that the HARQ unit 210 receives a transmission including the soft bit values [10, 28, −21, 8, −19, −30], corresponding to bit positions 1-6.

At step 420, a determination is made about whether the received transmission is an initial transmission (i.e., the first attempt to transmit a particular message). For example, referring to FIG. 2, the HARQ unit 210 may determine whether the received transmission is a first transmission or is a repeated transmission of a message.

If it is determined at step 420 that the received transmission is an initial transmission, then at step 430, the HARQ buffer may be cleaned to remove any previous data. For example, referring to FIG. 2, the combiner 214 may remove or delete any bit values stored in the HARQ buffer 212 (or in a portion thereof).

At step 435, the received transmission may be stored in the HARQ buffer. For example, referring to FIG. 2, the soft bit values [10, 28, −21, 8, −19, −30] of the received transmission may be stored in the HARQ buffer 212. After step 435, the sequence 400 continues at step 450 (described below).

However, if it is determined at step 420 that the received transmission is not an initial transmission, then at step 440, the soft bit values of the received transmission may be combined with the corresponding soft bit values stored in the HARQ buffer. For example, referring to FIG. 2, assume that the HARQ buffer 212 includes seven locations (i.e., locations 1-7), and is currently storing the seven soft bit values [6, 10, −7, 13, −1, −10, 4]. In this example, the combiner 214 may add the received soft bit values [10, 28, −21, 8, −19, −30] to the corresponding soft bit values in locations 1-6 [6, 10, −7, 13, −1, −10] to obtain the combined soft bit values [16, 38, −28, 21, −20, −40]. At step 445, the combined values may be stored in the HARQ buffer. For example, referring to FIG. 2, the combined soft bit values [16, 38, −28, 21, −20, −40] may be stored in location 1-6 of the HARQ buffer 212. Accordingly, after step 445, the HARQ buffer 212 may include the seven soft bit values [16, 38, −28, 21, −20, −40, 4].

At step 450, a determination is made about whether the received transmission includes multiple values for the same bit. For example, referring to FIG. 2, the combiner 214 may determine that a received transmission (e.g., [11, −3, −8, −4, −19, 20, 10, 14]) includes two values (e.g., 11 and 14) for bit position 1. In one or more embodiments, in the case that the transmission includes more bit values than the number of bit locations in the HARQ buffer, the additional bit values may be treated as corresponding to the bit locations in a circular fashion (i.e., returning to the first bit location after the last bit location).

If it is determined at step 450 that the received transmission does not include multiple values for the same bit, then the sequence 400 continues at step 460 (described below). However, if it is determined at step 450 that the received transmission includes multiple values for the same bit, then at step 455, the multiple values for the same bit may be soft combined and stored in the HARQ buffer. For example, referring to FIG. 2, the combiner 214 may soft combine any multiple values for the same bit (e.g., 11 and 14 for bit 1) that may be included in the received transmission, and may store the combined result (e.g., 25) in the corresponding location of the HARQ buffer 212 (e.g., location 1).

At step 460, the largest absolute soft bit value stored in the HARQ buffer may be determined. For example, referring to FIG. 2, assume that the HARQ buffer 212 includes the seven soft bit values [16, 38, −28, 21, −20, −40, 4]. In this example, the combiner 214 may determine that the largest absolute value is 40 (i.e., the absolute value of the soft bit value in location 6).

At step 470, the bit width difference between the largest absolute value in the HARQ buffer (determined at step 460) and a maximum bit width of a decoder input may be determined. For example, referring to FIG. 2, the scaler 216 may determine that the input of the decoder 230 is limited to a bit width of 6 bits signed (i.e., values between −31 and +31). Further, the scaler 216 may determine that the largest absolute value in the HARQ buffer 212 (e.g., 40) requires a bit width of 7 bits signed (providing values between −63 and +63). In this situation, the scaler 216 may determine that the aforementioned bit width difference is equal to 1 (i.e., the difference between 7 bits and 6 bits).

At step 480, all soft bit values in the HARQ buffer may be rightward shifted by the bit width difference (determined at step 470) to obtain transformed values. In one or more embodiments, the rightward shifting may be an arithmetic right shift. For example, referring to FIG. 2, the scaler 216 may rightward shift each soft bit value stored in the HARQ buffer 212 by the bit width difference between the largest absolute buffer value and the maximum bit width of the decoder input. Thus, in this example, the scaler 216 may rightward shift the seven soft bit values [16, 38, −28, 21, −20, −40, 4] stored in the HARQ buffer 212 by the bit width difference (i.e., 1 bit) to obtain the seven transformed values [8, 19, −14, 10, −10, −20, 2]. In this manner, the soft bit values in the HARQ buffer 212 may be transformed to fit within the bit width of the decoder 230 (i.e., 6 bits signed, corresponding to a range of values between −31 and +31).

At step 490, the transformed soft bit values (transformed at step 480) may be provided to a decoder input. For example, referring to FIG. 2, the scaler 216 may provide the transformed soft bit values to the decoder input buffer 220. The decoder input buffer 220 may provide the soft bit values to the decoder 230. in some embodiments, the decoder 230 may perform FEC decoding of these soft bit values to obtain an output of decoded bits. After step 490, the sequence 400 ends.

Figure 5:
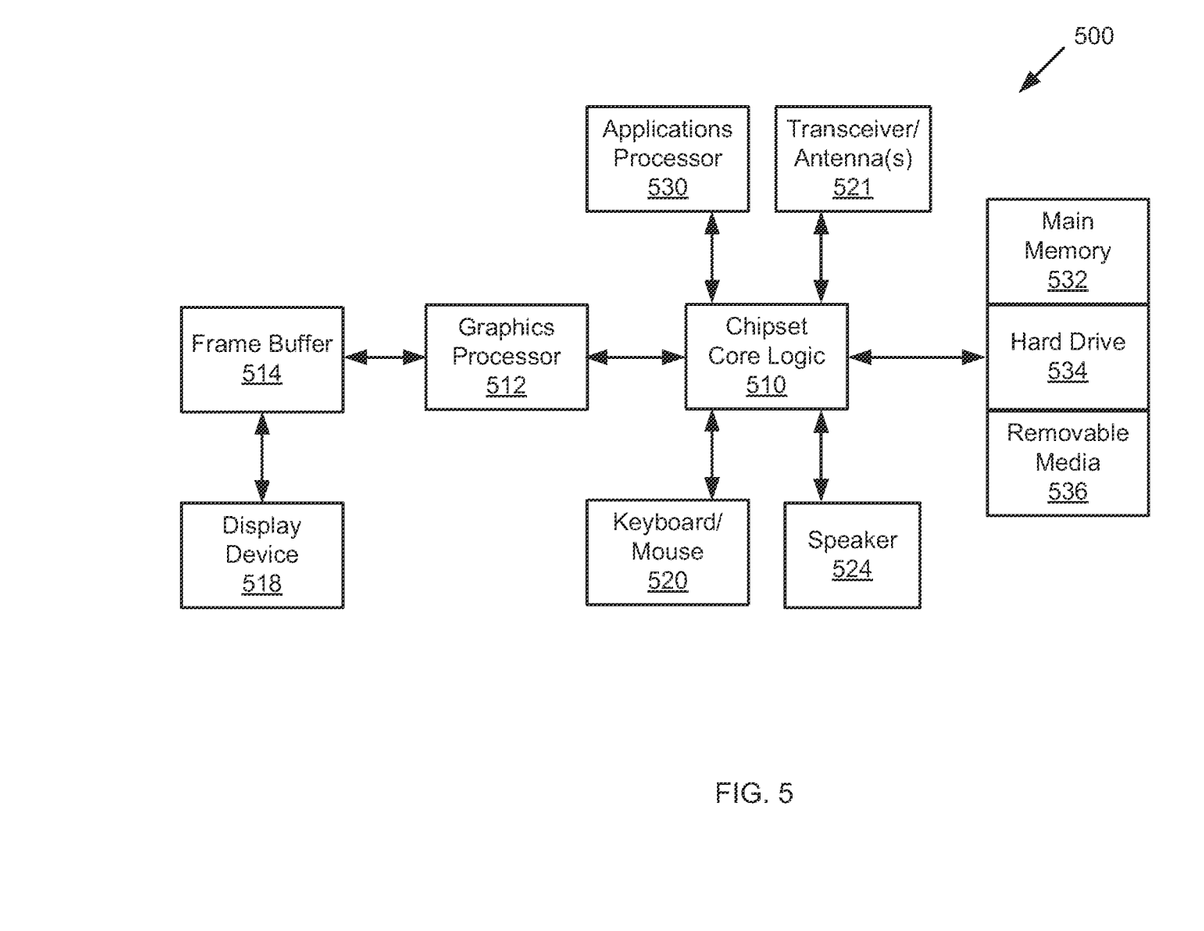
FIG. 5 is a block diagram of an example system in accordance with one or more embodiments.

Embodiments may be used in many different environments. Referring now to FIG. 5, shown is a block diagram of a computer system 500 with which embodiments can be used. In some embodiments, the computer system 500 may correspond generally to the UE device 150 and/or the base station 110 shown in FIG. 1. The computer system 500 may include a hard drive 534 and a removable storage medium 536, coupled by a bus (shown as an arrow) to a chipset core logic 510. A keyboard and/or mouse 520, or other conventional components, may be coupled to the chipset core logic.

The core logic may couple to the graphics processor 512, and the applications processor 530 in one embodiment. The graphics processor 512 may also be coupled to a frame buffer 514. The frame buffer 514 may be coupled to a display device 518, such as a liquid crystal display (LCD) touch screen. In one embodiment, the graphics processor 512 may be a multi-threaded, multicore parallel processor using single instruction multiple data (SIMD) architecture.

The chipset logic 510 may include a non-volatile memory port to couple to the main memory 532. Also coupled to the core logic 510 may be a radio transceiver and antenna(s) 521, 522. Speakers 524 may also be coupled to core logic 510.

Figure 6:
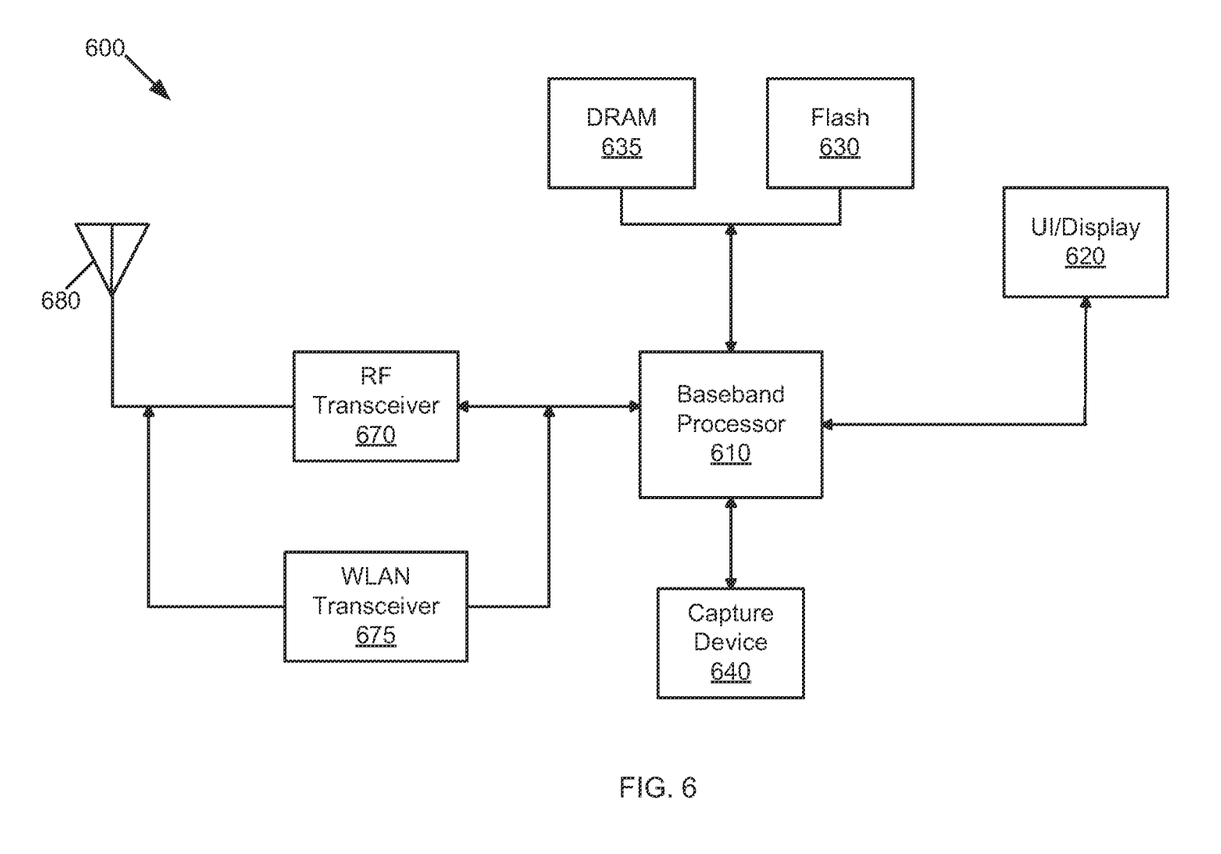
FIG. 6 is a block diagram of an example system in accordance with one or more embodiments.

Referring now to FIG. 6, shown is a block diagram of an example system 600 with which embodiments can be used.

As seen, system 600 may be a smartphone or other wireless communicator. As shown in the block diagram of FIG. 6, system 600 may include a baseband processor 610 which may be a multicore processor that can handle both baseband processing tasks as well as application processing. Thus baseband processor 610 can perform various signal processing with regard to communications, as well as perform computing operations for the device. In turn, baseband processor 610 can couple to a user interface/display 620 which can be realized, in some embodiments by a touch screen display. In addition, baseband processor 610 may couple to a memory system including, in the embodiment of FIG. 6 a non-volatile memory, namely a flash memory 630 and a system memory, namely a dynamic random access memory (DRAM) 635. As further seen, baseband processor 610 can further couple to a capture device 640 such as an image capture device that can record video and/or still images.

To enable communications to be transmitted and received, various circuitry may be coupled between baseband processor 610 and an antenna 680. Specifically, a radio frequency (RF) transceiver 670 and a wireless local area network (WLAN) transceiver 675 may be present. In general, RF transceiver 670 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. Other wireless communications such as receipt or transmission of radio signals, e.g., AM/FM, or global positioning satellite (GPS) signals may also be provided. In addition, via WLAN transceiver 675, local wireless signals, such as according to a Bluetooth™ standard or an IEEE 802.11 standard such as IEEE 802.11a/b/g/n can also be realized. Note that the link between baseband processor 610 and one or both of transceivers 670 and 675 may be via a low power converged interconnect that combines and maps functionality of a PCIe™ interconnect and a low power interconnect such as a MIPI interconnect. Although shown at this high level in the embodiment of FIG. 6, understand the scope of the present invention is not limited in this regard.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments. One example embodiment may be a method for data communication, including: receiving a first set of soft bit values in a Hybrid Automatic Repeat-Request (HARQ) buffer using a first bit width; soft combining the first set of soft bit values with a second set of soft bit values to obtain a set of combined soft bit values; and transforming the set of combined soft bit values from the first bit width to a decoder input bit width to obtain a set of transformed soft bit values. The method may also include determining a maximum absolute value of the set of combined soft bit values. The method may also include determining a bit width difference between the maximum absolute value and the decoder input. The method may also include rightward shifting each of the set of combined soft bit values by the bit width difference. The rightward shifting each of the set of combined soft bit values may include using arithmetic right shifting. The method may also include decoding the set of transformed soft bit values. The method may also include decoding the set of transformed soft bit values comprises forward error correction decoding. The method may also include receiving the first set of soft bit values using at least one antenna. The soft combining the first set of soft bit values with the second set of soft bit values may include adding each value of the first set to a corresponding value of the second set. The method may also include soft combining the first set of soft bit values with the second set of soft bit values without using saturated addition. The method may also include storing the set of combined soft bit values in the HARQ buffer. The method may also include receiving the second set of soft bit values using the at least one antenna, wherein the second set of soft bit values are transmitted in response to a request for retransmission. The method may also include, in response to determining that the first set of soft bit values corresponds to an initial transmission, cleaning the HARQ buffer. The method may also include, in response to determining that the first set of soft bit values includes multiple soft bit values for a single bit, combining the multiple soft bit values for the single bit. The method may also include, in response to determining that the second set of soft bit values includes multiple soft bit values for a single bit, combining the multiple soft bit values for the single bit.

Another example embodiment may be at least one machine readable medium comprising a plurality of instructions that in response to being executed by a computing device, cause the computing device to carry out the above described method.

Still another example embodiment may be a communication device arranged to perform the above described method.

Yet another example embodiment may be a wireless device including an antenna and a control module coupled to the antenna, the control module to: combine soft bit values of a plurality of transmissions without information loss; determine a maximum bit width of the combined soft bit values; and transform a bit width of each of the combined soft bit values based on a bit width of a decoder input and the maximum bit width of the combined soft bit values. The combined soft bit values may be stored in a Hybrid Automatic Repeat-Request (HARQ) buffer. The control module may be to perform an arithmetic right shift of the combined soft bit values based on the difference between the bit width of the decoder input and the maximum bit width of the combined soft bit values. The control module may be to decode the transformed soft bit values. The control module may decode the transformed soft bit values using Forward Error Correction (FEC).

A further example embodiment may be a Hybrid Automatic Repeat-Request (HARQ) unit including: a combiner to combine soft bit values of at least transmission; a buffer to store the combined soft bit values; and a scaler to transform the combined soft bit values stored in the buffer based on a bit width of a decoder input. The combiner may be to combine the soft bit values without information loss due to saturated addition. The bit width of the buffer may be predefined to store any soft bit values included in received transmissions. The scaler may be to determine a maximum absolute value of the combined soft bit values stored in the buffer. The scaler may be to rightward shift each of the combined soft bit values stored in the buffer based on the maximum absolute value.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. For example, it is contemplated that the above described processes may be performed at any location(s) in the network (e.g., at a UE device 150 level, at a base station 110 level, at a network level, or any combination thereof). In another example, the above described functionality of the UE device 150 and/or the base station 110 may be implemented in any other wireless device (s) (e.g., user equipment, mobile telephone, personal communication device, computer, node, relay, repeater, router, etc.). It is intended that the appended claims cover all such modifications and variations as fall within the true spirit and scope of this present invention.

What is claimed is:

1. A method for data communication, comprising:
   receiving a first set of soft bit values in a Hybrid Automatic Repeat-Request (HARQ) buffer using a first bit width;
   soft combining the first set of soft bit values with a second set of soft bit values to obtain a set of combined soft bit values; and
   transforming the set of combined soft bit values from the first bit width to a decoder input bit width to obtain a set of transformed soft bit values.

2. The method of claim 1 including determining a maximum absolute value of the set of combined soft bit values.

3. The method of claim 2 including determining a bit width difference between the maximum absolute value and the decoder input.

4. The method of claim 3 including rightward shifting each of the set of combined soft bit values by the bit width difference.

5. The method of claim 4, wherein rightward shifting each of the set of combined soft bit values comprises using arithmetic right shifting.

6. The method of claim 1 including decoding the set of transformed soft bit values.

7. The method of claim 6, wherein decoding the set of transformed soft bit values comprises forward error correction decoding.

8. The method of claim 1 including receiving the first set of soft bit values using at least one antenna.

9. The method of claim 1, wherein soft combining the first set of soft bit values with the second set of soft bit values includes adding each value of the first set to a corresponding value of the second set.

10. The method of claim 1 including soft combining the first set of soft bit values with the second set of soft bit values without using saturated addition.

11. The method of claim 1 including storing the set of combined soft bit values in the HARQ buffer.

12. The method of claim 11 including receiving the second set of soft bit values using the at least one antenna, wherein the second set of soft bit values are transmitted in response to a request for retransmission.

13. The method of claim 1 including, in response to determining that the first set of soft bit values corresponds to an initial transmission, cleaning the HARQ buffer.

14. The method of claim 1 including, in response to determining that the first set of soft bit values includes multiple soft bit values for a single bit, combining the multiple soft bit values for the single bit.

15. The method of claim 1 including, in response to determining that the second set of soft bit values includes multiple soft bit values for a single bit, combining the multiple soft bit values for the single bit.

16. At least one non-transitory machine readable medium comprising a plurality of instructions that in response to being executed by a computing device, cause the computing device to carry out a method comprising:
   receiving a first set of soft bit values in a Hybrid Automatic Repeat-Request (HARQ) buffer using a first bit width;
   soft combining the first set of soft bit values with a second set of soft bit values to obtain a set of combined soft bit values; and
   transforming the set of combined soft bit values from the first bit width to a decoder input bit width to obtain a set of transformed soft bit values.

17. A wireless device comprising:
   an antenna; and
   a control module coupled to the antenna, the control module to:
      combine soft bit values of a plurality of transmissions without information loss;
      determine a maximum bit width of the combined soft bit values; and
      transform a bit width of each of the combined soft bit values based on a bit width of a decoder input and the maximum bit width of the combined soft bit values.

18. The wireless device of claim 17, wherein the combined soft bit values are stored in a Hybrid Automatic Repeat-Request (HARQ) buffer.

19. The wireless device of claim 17, wherein the control module is to perform an arithmetic right shift of the combined soft bit values based on the difference between the bit width of the decoder input and the maximum bit width of the combined soft bit values.

20. The wireless device of claim 17, wherein the control module is to decode the transformed soft bit values.

21. The wireless device of claim 20, wherein the control module is to decode the transformed soft bit values using Forward Error Correction (FEC).

22. A Hybrid Automatic Repeat-Request (HARQ) unit comprising:
   a combiner to combine soft bit values of at least one transmission;
   a buffer to store the combined soft bit values; and
   a scaler to transform the combined soft bit values stored in the buffer based on a bit width of a decoder input.

23. The HARQ unit of claim 22, wherein the combiner is to combine the soft bit values without information loss due to saturated addition.

24. The HARQ unit of claim 22, wherein a bit width of the buffer is predefined to store any soft bit values included in received transmissions.

25. The HARQ unit of claim 22, wherein the scaler is to determine a maximum absolute value of the combined soft bit values stored in the buffer.

26. The HARQ unit of claim 25, wherein the scaler is to rightward shift each of the combined soft bit values stored in the buffer based on the maximum absolute value.

27. The medium of claim 16, the method including determining a maximum absolute value of the set of combined soft bit values.

28. The medium of claim 27, the method including determining a bit width difference between the maximum absolute value and the decoder input.

29. The medium of claim 28, the method including rightward shifting each of the set of combined soft bit values by the bit width difference.

30. The medium of claim 29, wherein rightward shifting each of the set of combined soft bit values comprises using arithmetic right shifting.

\* \* \* \* \*